(12) United States Patent
Riehl

(10) Patent No.: US 9,912,197 B2
(45) Date of Patent: Mar. 6, 2018

(54) DUAL-MODE WIRELESS POWER RECEIVER

(71) Applicant: MediaTek Singapore Pte. Ltd., Singapore (SG)

(72) Inventor: Patrick Stanley Riehl, Cambridge, MA (US)

(73) Assignee: MEDIATEK Singapore Pte. Ltd., Solaris (SG)

( * ) Notice: Subject to any disclaimer, the term of this patent is extended or adjusted under 35 U.S.C. 154(b) by 680 days.

(21) Appl. No.: 13/956,374

(22) Filed: Aug. 1, 2013

(65) Prior Publication Data

US 2014/0035383 A1 Feb. 6, 2014

Related U.S. Application Data

(60) Provisional application No. 61/679,301, filed on Aug. 3, 2012, provisional application No. 61/782,637, filed on Mar. 14, 2013.

(51) Int. Cl.
*H02J 50/12* (2016.01)
*H01F 38/14* (2006.01)
(Continued)

(52) U.S. Cl.
CPC .............. *H02J 50/12* (2016.02); *H01F 38/14* (2013.01); *H02J 5/005* (2013.01); *H02J 7/025* (2013.01); *H02J 17/00* (2013.01)

(58) Field of Classification Search
None
See application file for complete search history.

(56) References Cited

U.S. PATENT DOCUMENTS 6,960,968 B2 11/2005 Odendaal
7,643,312 B2 * 1/2010 Vanderelli .............. H02J 17/00
363/8

(Continued)

FOREIGN PATENT DOCUMENTS

CN 101682216 A 3/2010
CN 101860089 A 10/2010
(Continued)

OTHER PUBLICATIONS

E. Waffenschmidt, "Wireless power for mobile devices", Oct. 2011, 2011 IEEE 33rd International Telecommunications Energy Conference (INTELEC).*

(Continued)

*Primary Examiner* — Rexford Barnie
*Assistant Examiner* — David Shiao
(74) *Attorney, Agent, or Firm* — Wolf, Greenfield & Sacks, P.C.

(57) ABSTRACT

A dual-mode receiver is provided that includes an electromagnetic resonator having one or more inductive elements that are arranged to form a receiver coil and a network of passive components arranged to form a matching network. The electromagnetic resonator includes a first selective frequency defined in a low frequency range and a second selective frequency defined in a high frequency range allowing for a rectification circuit to operate in both the high frequency range and low frequency range making maximum use of active circuits.

18 Claims, 9 Drawing Sheets

(51) Int. Cl.
*H02J 5/00* (2016.01)
*H02J 7/02* (2016.01)
*H02J 17/00* (2006.01)

(56) References Cited

U.S. PATENT DOCUMENTS

| | | | |
|---|---|---|---|
| 7,990,103 B2* | 8/2011 | Klinghult | H02J 7/025 320/108 |
| 8,217,535 B2* | 7/2012 | Uchida | H02J 5/005 307/104 |
| 2007/0222542 A1 | 9/2007 | Joannopoulos | |
| 2008/0157603 A1* | 7/2008 | Baarman | H02J 7/025 307/104 |
| 2008/0211320 A1 | 9/2008 | Cook | |
| 2009/0284220 A1 | 11/2009 | Toncich | |
| 2010/0068998 A1 | 3/2010 | Zyambo | |
| 2010/0190435 A1 | 7/2010 | Cook | |
| 2010/0289449 A1* | 11/2010 | Elo | H02J 5/005 320/108 |
| 2010/0308939 A1 | 12/2010 | Kurs | |
| 2011/0101790 A1* | 5/2011 | Budgett | A61M 1/127 307/104 |
| 2011/0169338 A1* | 7/2011 | Kozakai | H02J 5/005 307/104 |
| 2011/0304216 A1 | 12/2011 | Baarman | |
| 2012/0056580 A1 | 3/2012 | Kai et al. | |
| 2012/0146580 A1* | 6/2012 | Kitamura | H01F 38/14 320/108 |
| 2012/0248889 A1* | 10/2012 | Fukushi | H02J 17/00 307/104 |
| 2012/0262004 A1 | 10/2012 | Cook | |
| 2013/0026850 A1 | 1/2013 | Throngnumchai et al. | |
| 2013/0043727 A1 | 2/2013 | Liu | |
| 2013/0049484 A1* | 2/2013 | Weissentern | H02J 5/005 307/104 |
| 2013/0062961 A1* | 3/2013 | Park | H02J 17/00 307/104 |
| 2014/0049118 A1 | 2/2014 | Karalis et al. | |
| 2014/0117927 A1* | 5/2014 | Chateau | H04B 5/0075 320/108 |
| 2014/0159656 A1 | 6/2014 | Riehl | |
| 2015/0207333 A1 | 7/2015 | Baarman et al. | |
| 2016/0261148 A1 | 9/2016 | Riehl | |

FOREIGN PATENT DOCUMENTS

| | | |
|---|---|---|
| CN | 102113195 A | 6/2011 |
| CN | 102130513 A | 7/2011 |
| CN | 102150340 A | 8/2011 |
| WO | 2010025156 A1 | 3/2010 |
| WO | WO 2011/122249 A1 | 10/2011 |
| WO | 2011135571 A2 | 11/2011 |
| WO | WO 2014054227 A1 | 4/2014 |

OTHER PUBLICATIONS

"International Search Report" dated Jun. 13, 2014 for International application No. PCT/US14/17505, International filing date:Feb. 20, 2014.
Office Communication dated Jul. 4, 2016 for Chinese Application No. 201480015266.1.
International Search Report and Written Opinion dated Feb. 5, 2016 for International Application No. PCT/US2015/035009.
Office Communication dated Oct. 6, 2016 for related U.S. Appl. No. 14/181,731.
Office Action for U.S. Appl. No. 15/155,268 dated Nov. 3, 2016.
Waffenschmidt, Wireless power for mobile devices. 2011 IEEE 33rd International Telecommunications Energy Conference (INTELEC). 2011:1-9.

* cited by examiner

DUAL-MODE WIRELESS POWER RECEIVER

CROSS REFERENCE TO RELATED APPLICATIONS

This application claims priority from provisional application Ser. No. 61/679,301 filed Aug. 3, 2012 and provisional application Ser. No. 61/782,637 filed Mar. 14, 2013, each incorporated herein by reference in its entirety.

BACKGROUND

The invention is related to the field of wireless power transfer, and in particular to a dual-mode wireless power receiver.

Wireless power (WP) transfer systems use the mutual inductance between two magnetic coils to transfer power through magnetic induction. These systems are commonly classified as either "inductive" or "resonant". In a purely inductive wireless power transfer system, the source coil, which functions as the primary winding of a transformer, is driven by a voltage or current source. The receive coil, which functions as the secondary winding, is connected to a bridge rectifier, either directly or through an ac-coupling capacitor. The voltages and currents in the two windings can be determined by the relations commonly used to describe transformers.

In a resonant wireless power transfer system, the source and receiver coils are connected to capacitors to form electrical resonators. From a circuit-design standpoint, the function of the capacitors is to cancel some of the reactive impedance of the inductors, allowing more power to be transferred at a given voltage. The impedance of the inductors and capacitors varies in opposite directions with operating frequency, so the cancellation is only effective over a small range of frequencies. In other words, resonant wireless power systems utilize circuits tuned to a specific frequency at which power is to be transferred. They typically do not allow power transfer at other frequencies.

In recent years, two wireless power standards have started to emerge. The Wireless Power Consortium has released the Qi standard, which is commonly classified as an inductive charging standard. Although a resonant capacitor is used, the quality factor Q used in the Qi standard is in the low single-digits, implying that resonance is not being substantially leveraged. Devices complying with the Qi standard transmit power in the frequency range of 110-205 kHz. Qi devices typically require relatively close alignment of the source and receiver coils.

More recently, several organizations have started to introduce wireless power systems that make use of high quality factor resonant circuits to increase the usable range over which charging can occur. The frequencies used are typically much higher than those used in inductive chargers, largely due to the fact that quality factor of an inductor is proportional to frequency. One proposal for the emerging standard for resonant wireless power recommends an operating frequency in the ISM band at 6.78 MHz.

SUMMARY

According to one aspect of the invention, there is provided a dual-mode receiver. The dual-mode receiver includes an electromagnetic resonator having one or more inductive elements that are arranged to form a receiver coil and a network of passive components arranged to form a matching network. The electromagnetic resonator includes a first selective frequency defined in a low frequency range and a second selective frequency defined in a high frequency range allowing for a rectification circuit to operate in both the high frequency range and low frequency range making maximum use of active circuits.

According to another aspect of the invention, there is provided a wireless receiver. The wireless receiver includes an electromagnetic resonator having one or more inductive elements that are arranged to form a receiver coil and a network of passive components arranged to form a matching network. The electromagnetic resonator includes a first selective frequency defined in a low frequency range and a second selective frequency defined in a high frequency range allowing for a rectification circuit to operate in both the high frequency range and low frequency range making maximum use of active circuits.

According to another aspect of the invention, there is provided a method of performing the operations of a wireless receiver. The method includes arranging an electromagnetic resonator to include one or more inductive elements that are arranged to form a receiver coil and a network of passive components arranged to form a matching network. Moreover, the method includes providing the electromagnetic resonator having a first selective frequency defined in a low frequency range and a second selective frequency defined in a high frequency range allowing for a rectification circuit to operate in both the high frequency range and low frequency range making maximum use of active circuits.

DETAILED DESCRIPTION

This invention involves the design of a dual-mode wireless power receiver. The dual-mode wireless power receiver can receive power from either an inductive charger operating in the range of hundreds of kHz or a resonant charger operating at a frequency in the MHz range. The dual-mode wireless power receiver can have a low-frequency operating range of 110-205 kHz and a high operation frequency of 6.78 MHz, but the invention can generally be used for any two frequency bands separated by a factor of at least 5.

Figure 1:
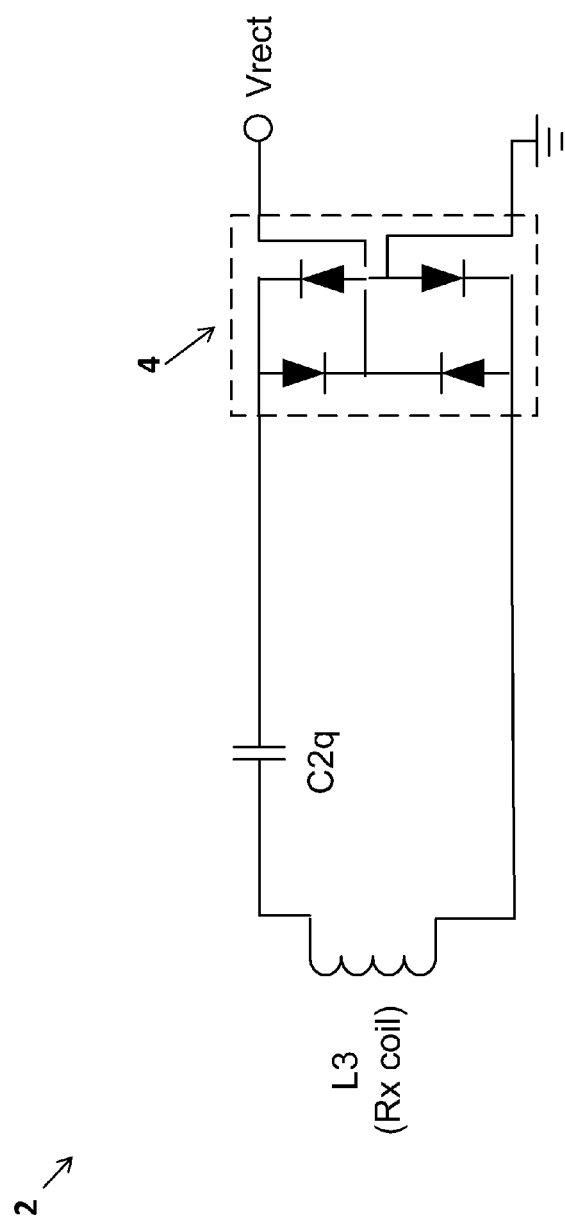
FIG. 1 is a schematic diagram illustrating an applications circuit that implements a low-Q, inductive charging receiver.

FIG. 1 is a schematic diagram illustrating an inductive wireless power receiver circuit 2 that implements a low-Q, inductive charging receiver. An inductor L3 represents the receiver coil (Rx coil), which is magnetoelectrically coupled to a source coil. AC power induced in L3 is rectified by a bridge rectifier 4 to generate a dc voltage Vrect. The bridge rectifier 4 is an arrangement of four (or more) diodes in a bridge circuit configuration that provides the same polarity of output for either polarity of input. A bridge rectifier provides full-wave rectification from a two-wire AC input, resulting in lower cost and weight as compared to a rectifier with a 3-wire input from a transformer with a center-tapped secondary winding. Capacitor C2$q$ and inductor L3 form an electromagnetic resonator with a resonant frequency around the wireless power operating frequency. This frequency is typically in the range of hundreds of kHz. The series resonant circuit that includes L2 and C2$q$ also includes the impedance of the bridge rectifier 4. This includes the circuit that is drawing wireless power, so it can be relatively high. The quality factor of the electromagnetic resonator is given by $$Q_s = \frac{\omega_i L_2}{R_l} \qquad \text{Eq. 1}$$

where $\omega i$ is the angular operating frequency of the inductive wireless power system and RI is the equivalent resistance of the diode bridge rectifier 4. Resistance RI can be relatively high, so the quality factor of this circuit is typically in the low single digits. A value of Cs is chosen such that the resonant frequency of the electromagnetic resonator is equal to the operating frequency of the inductive wireless power system, using the equation $$\omega_i = \frac{1}{\sqrt{L_2 C_s}} \qquad \text{Eq. 2}$$

Figure 2:
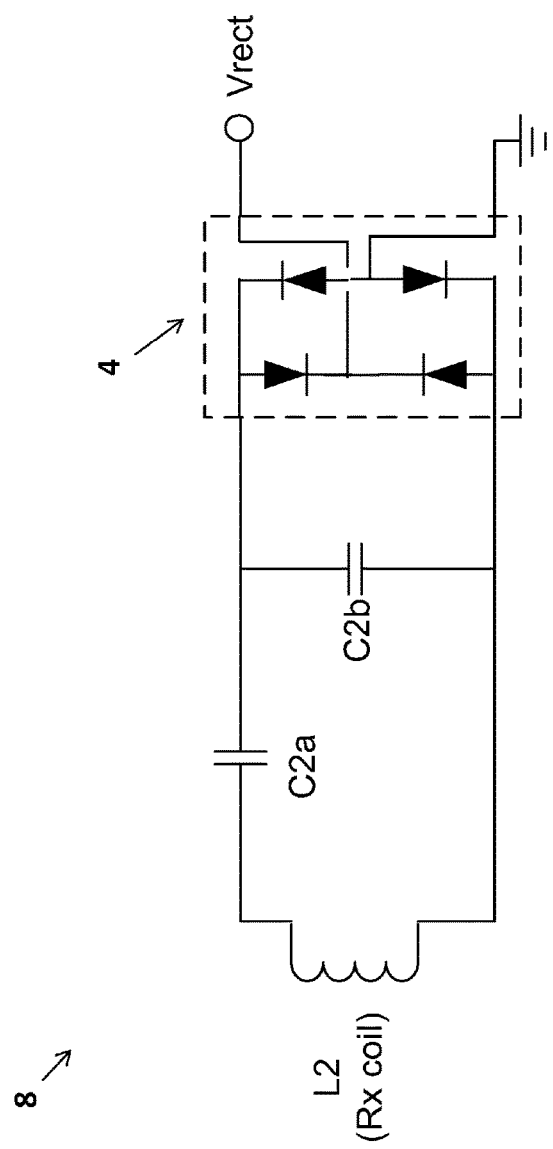
FIG. 2 is a schematic diagram illustrating a second applications circuit used in accordance with the invention that implements a high-Q resonant wireless power receiver.

FIG. 2 is a schematic diagram illustrating a resonant power receiver circuit 8 used in accordance with the invention that implements a high-Q resonant wireless power receiver. An inductor L2 represents the receiver coil (Rx coil). Capacitors C2$a$ and C2$b$ form a resonant matching network between L2 and the bridge rectifier 4. This matching network is series-parallel because C2$a$ is in series with the load and C2$b$ is in parallel with it. The inductor L2 and the capacitors C2$a$ and C2$b$ form an electromagnetic resonator. Because some of the inductor current can circulate in a loop including only L2, C2$a$ and C2$b$ (plus parasitic resistance), the quality factor of this electromagnetic resonator can be relatively high, perhaps greater than 100. To choose the values of C2$a$ and C2$b$, one needs to ensure that their series combination is resonant with L2 at the desired operating frequency $\omega r$.

$$\omega_r = \frac{1}{\sqrt{L_2 \frac{1}{\frac{1}{C_{2a}} + \frac{1}{C_{2b}}}}} \qquad \text{Eq. 3}$$

It is preferred in some cases to operate the resonant receiver at a relatively high frequency to maximize the quality factor of the resonator. In other embodiments an operating frequency of 6.78 MHz is used.

There would be significant utility for a dual-mode wireless power receiver that could receive power from either an inductive charger operating in the 100 s of kHz or a resonant charger operating at a frequency in the MHz range. The example discussed here has a low-frequency operating range of 110-205 kHz and a high operation frequency of 6.78 MHz, but the method is generally useful for any two frequency bands separated by a factor of at least 5.

Although the circuit topologies of the inductive receiver and the resonant receiver are similar, the required inductance and capacitance values are typically quite different, given the different operating frequencies. For a given application, there are some constraints on the usable rectified voltage range. For example, for mobile electronics that use Lithium-ion batteries, it is desirable to produce a regulated 5V supply in order to charge the battery at 3.0-4.2 V. Thus the rectified voltage should be chosen in the range of 5V-15V such that a step-down regulator such as a buck regulator or linear dropout regulator can be selected to produce the regulated 5V supply efficiently. For a dual-mode receiver, this voltage range should be observed in both modes. However, for the same value of receiver-coil inductance, a much higher voltage is generated at 6.78 MHz than at 100 kHz, given the fact that induced voltage is expressed by $$V_{ind} = \omega M I_1 \qquad \text{Eq. 4}$$

where Vind is the induced voltage, M is the mutual inductance, I1 is the source-coil current and $\omega$ is the operating angular frequency. The mutual inductance M is proportional to the square root of the product of the source coil and receiver coil inductances. Thus, it would be advantageous for the dual-mode receiver if the effective inductance of the electromagnetic resonator were higher at low frequencies than at high frequencies.

Figure 3:
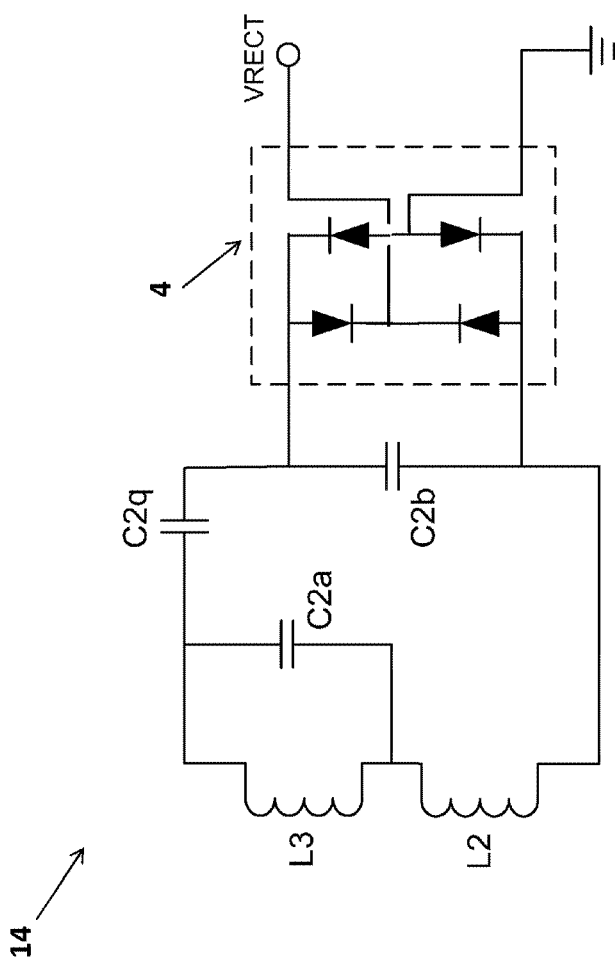
FIG. 3 is a schematic diagram illustrating the circuit topology of the inventive dual-mode receiver.

FIG. 3 shows the circuit topology 14 of the dual-mode receiver. It has the property that the effective inductance of the electromagnetic resonator is much higher at low frequencies than at high frequencies. This occurs because the capacitor C2$a$ has an impedance much lower than the inductor L3 at high frequencies, thus it shunts L3. At low frequencies, the two inductors appear in series so as to give the required high inductance value.

It is possible to make some rough approximations to better understand the operation of the dual-mode receiver. Let us assume that the inductance of L3 is 10× the inductance of L2. Furthermore, let us assume that the capacitance of C2$q$ is roughly 100× the capacitance of C2$a$ or C2$b$. Finally, let us assume that the capacitors are chosen such that the impedance of C2$q$ is negligibly small at 6.78 MHz, and that the impedances of C2$a$ and C2$b$ are negligibly large at 100 kHz. One can judge whether the capacitances are negligible by comparing them to the impedance of the inductors.

At low frequency (e.g., 100 kHz), the C2$a$ and C2$b$ capacitors can be approximated as open circuits. Thus the receiver circuit can be reduced to a pure series LC circuit in which L2, L3 and C2$q$ are the series elements. The effective inductance is 11×L2. One can choose C2$q$ to combine with this inductance to create a series resonance at 100 kHz, as required by the Qi specification.

At high frequency (e.g., 6.78 MHz), the C2$q$ capacitor can be modeled as a short circuit. The parallel combination of C2$a$ and L3 is dominated by C2$a$. Thus the receiver circuit can be reduced to a series-parallel resonant circuit where L2, C2$a$ and C2$b$ are the active elements, similar to FIG. 2. This circuit can be tuned to resonance at 6.78 MHz. The effective inductance of this circuit at high frequency is approximately equal to L2, although a small contribution from L3 can also be observed.

A wireless power receiver using this coil arrangement and matching network can receive power either from an inductive charger at low frequency (e.g., 100 kHz-200 kHz) or at high frequency (e.g., 6.78 MHz). The same rectification and regulation produced by the bridge rectifier 4 can be used, thus making maximum use of the active circuitry. The frequency of the ac power can be detected and used to determine which communications protocol to be used, if any.

Figure 4:
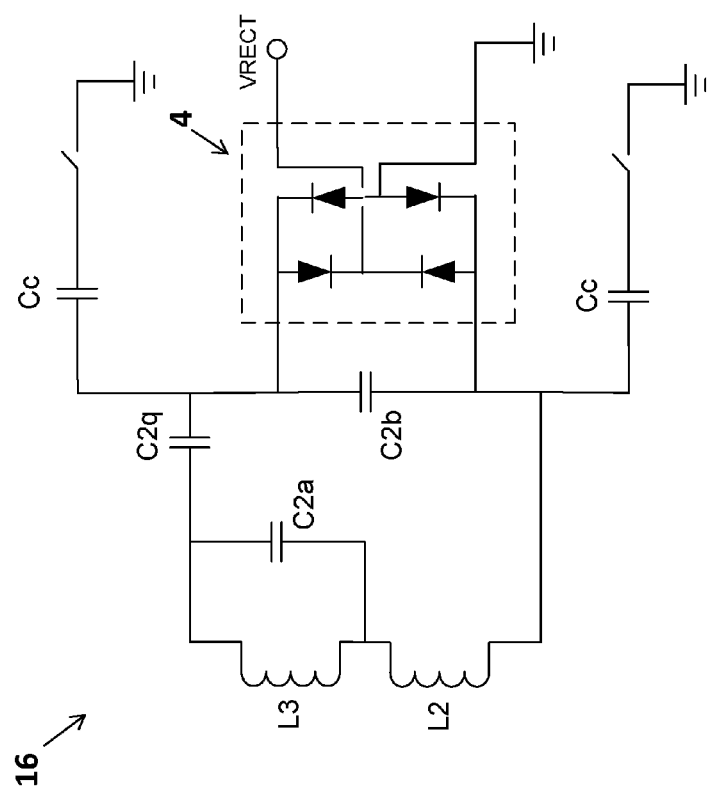
FIG. 4 is a schematic diagram illustrating load modulation being implemented through the use of switched capacitors Cc in accordance with the invention.

In some inductive wireless power standards, load modulation may be used for in-band communications. The load modulation may be implemented through the use of switched capacitors Cc, as shown in FIG. 4. These capacitors Cc apply some detuning when switched in, presenting a variation in the impedance seen by the source amplifier, which can be decoded to recover some information. The value of the capacitors Cc is typically on the order of the C2q capacitor. In the high-frequency resonant mode, these capacitors can be used as voltage clamps. Switching in the Cc capacitors couples the input terminals of the rectifier to ground with a low ac impedance. This can be used as a protection mechanism, to limit the ac voltage applied to the terminals of an IC that has a maximum voltage tolerance.

Figure 5:
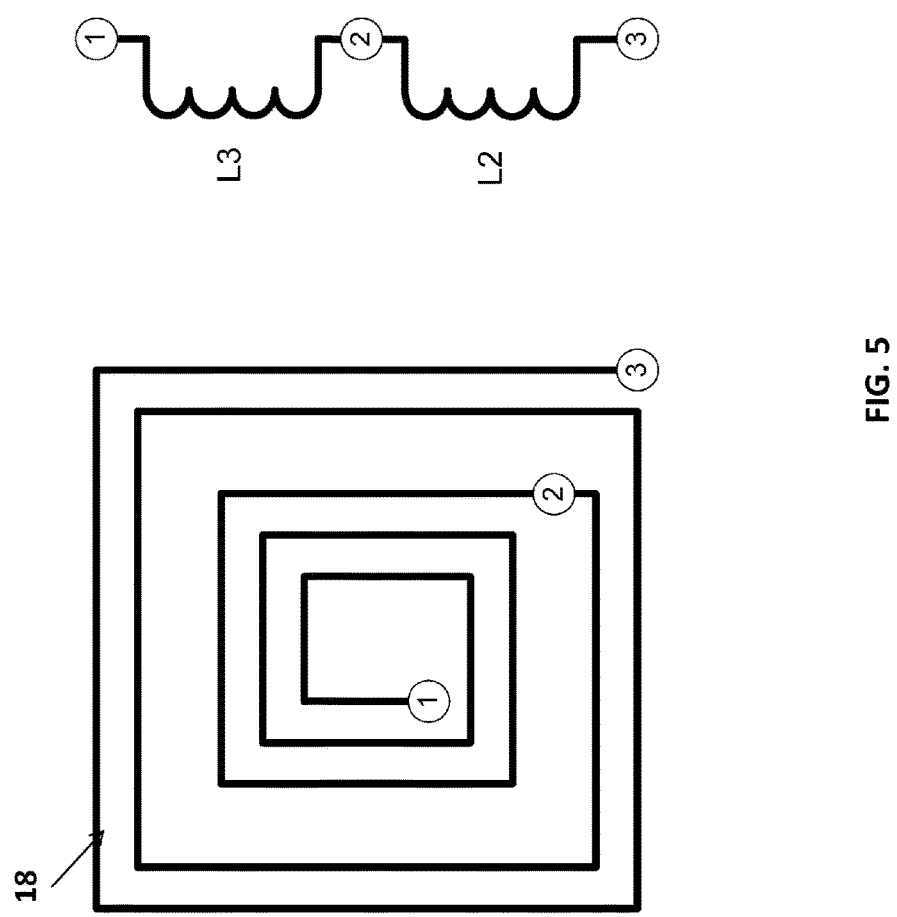
FIG. 5 is a schematic diagram illustrating a coil arrangement used in accordance with the invention.

FIG. 5 shows a coil arrangement 18 that can form two separate inductors in the same plane of a printed circuit board, making it possible to save circuit area. In the example of FIG. 5, the two inductors are arranged in a planar, concentric fashion with the L3 inductor on the inside and the L2 inductor on the outside. The orientation can also be reversed such that the L3 inductor is on the outside and the L2 inductor is on the inside. Realizing the inductive coil elements in a planar arrangement is advantageous because the thickness of the coil assembly can be minimized. Realizing the inductive coil elements in a concentric fashion is advantageous because it makes maximal use of a limited space. Both area and thickness may be highly constrained in a portable electronic device. The two coils have mutual inductance to each other, but this effect can be accounted for in the tuning network. Other embodiments can use different arrangements to satisfy the requirements of inductors L2 and L3. The connection points 1-3 illustrate the interconnection points for the overall concentric arrangement 18. In addition to a printed circuit board, any planar mass-production process may be used to implement the inductive coil arrangement.

Figure 6:
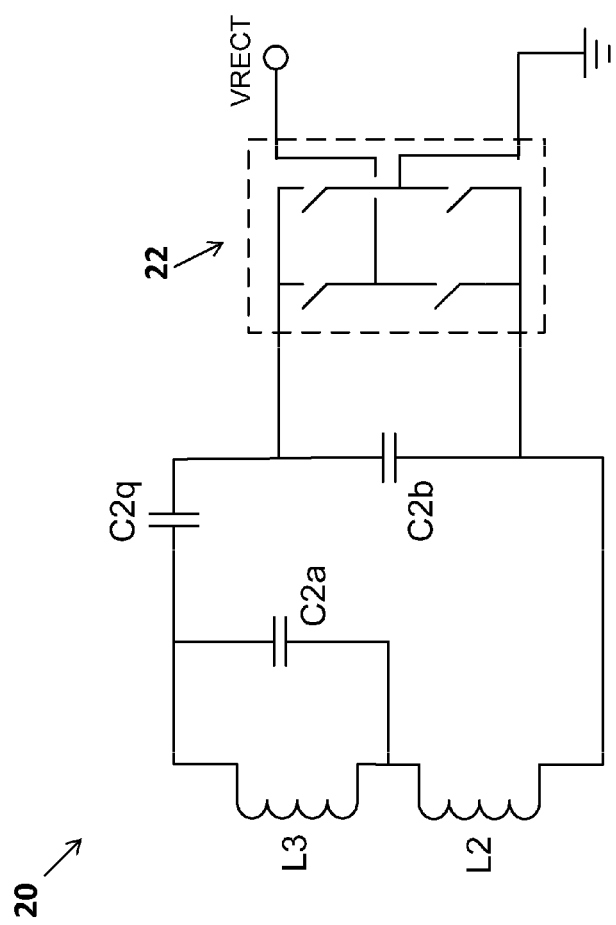
FIG. 6 is a schematic diagram illustrating an embodiment of the invention that includes a synchronous rectifier.

The diode bridge rectifier 4 can be replaced with a synchronous rectifier 22 in any of the receiver circuits to reduce ohmic losses as shown in FIG. 6. The synchronous rectifier 22 improves the efficiency of rectification by replacing diodes with actively controlled switches such as transistors, usually power MOSFETs or power BJTs. Historically, vibrator driven switches or motor-driven commutators have also been used for mechanical rectifiers and synchronous rectification, which also be used in accordance with the invention.

Essentially, the invention describes a receiver-side circuit that can operate either in a low-frequency inductive charging system such as Qi or a higher-frequency resonant wireless power system. The invention allows for the use of complicated coil arrangements and one more passive component than a single-mode receiver. Moreover, the dual-mode wireless power receiver can have a low-frequency operating range of 110-205 kHz and a high operation frequency of 6.78 MHz, but the invention can generally be used for any two frequency bands separated by a factor of at least 5.

Figure 7:
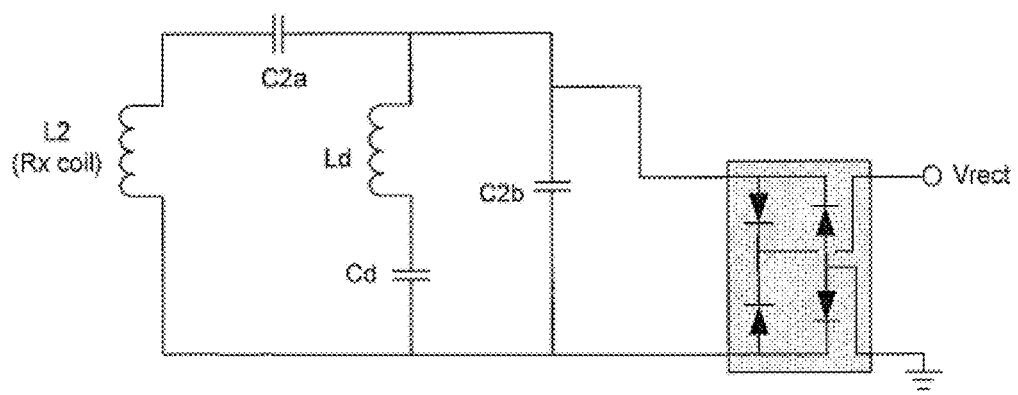
FIG. 7 shows a dual-mode wireless power receiver circuit with a detection resonator.

In the Qi inductive charging standard, a requirement exists to implement a resonant circuit at 1 MHz for the purposes of detection. If a detection resonant circuit is required, it can be added using a series LC circuit as shown in FIG. 7. The resonant frequency of this detection circuit is approximately given by $$\omega_d = \frac{1}{\sqrt{(L_2 + L_d)\frac{1}{\frac{1}{C_{2a}} + \frac{1}{C_d}}}}$$

Figure 8:
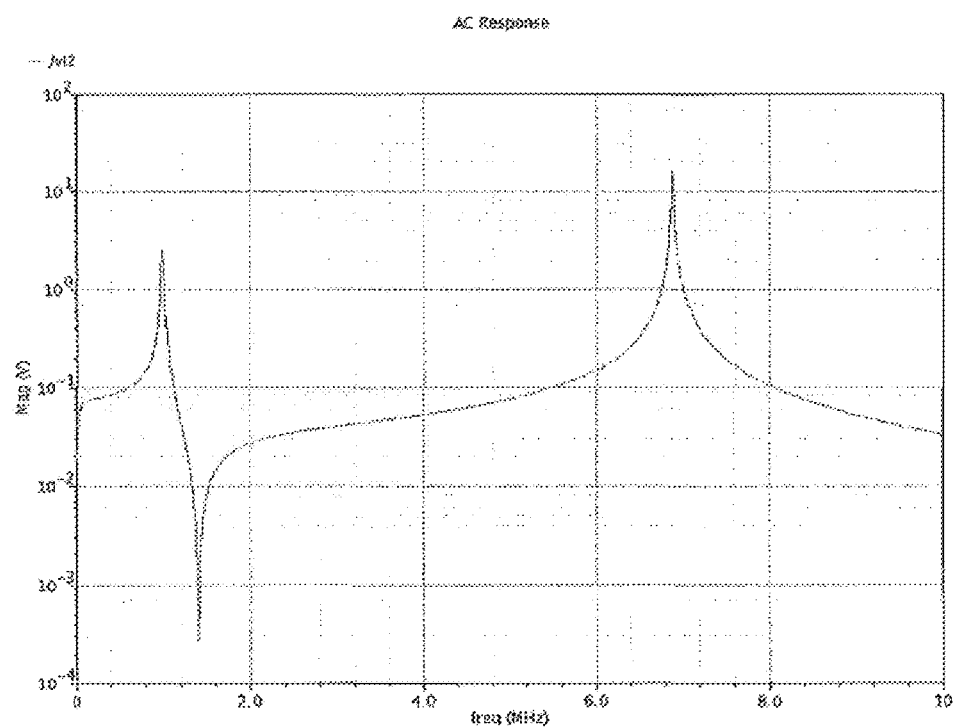
FIG. 8 shows a magnitude Bode plot of the dual-mode receiver circuit with detection resonator

FIG. 8 shows a magnitude Bode plot of the dual-mode circuit with detection resonant circuit. Two resonant peaks are visible: at the detection frequency and the resonant charging frequency. The rolloff below 100 kHz due to the series capacitor is also visible.

Figure 9:
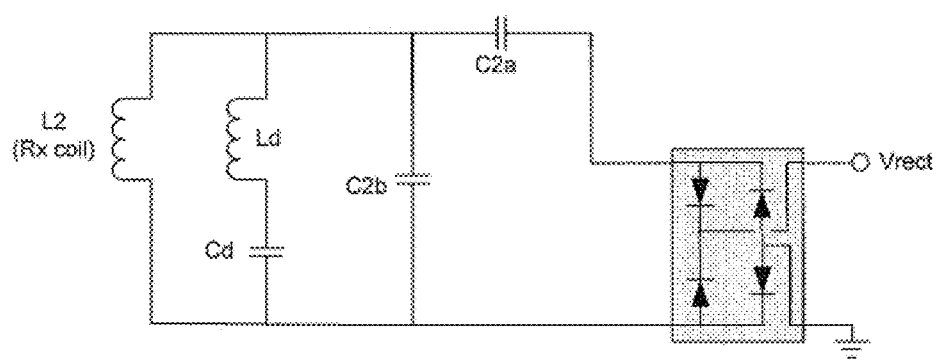
FIG. 9 shows a parallel-series dual-mode receiver circuit.

It is also possible to construct a parallel-series resonant circuit that resonates at two different frequencies. The circuit is shown in FIG. 9. As in the series-parallel circuit, C2b is tuned for resonance at the higher operating frequency, and C2a is tuned for resonance at the lower operating frequency. Inductor Ld and capacitor Cd are tuned for resonance at the detection frequency.

Although the present invention has been shown and described with respect to several preferred embodiments thereof, various changes, omissions and additions to the form and detail thereof, may be made therein, without departing from the spirit and scope of the invention.

What is claimed is:

1. A wireless power receiver comprising:
    an electromagnetic resonator that includes:
        a plurality of inductive elements connected in series and forming receiver coil; and
        a network of passive components comprising a plurality of capacitors arranged to form a matching network, the network of passive components comprising a first capacitor in parallel with a first inductive element of the plurality of inductive elements,
    wherein the electromagnetic resonator passively resonates at both a first resonant frequency and a second resonant frequency higher than the first resonant frequency to wirelessly receive power to provide to a rectifier.

2. The wireless power receiver of claim 1, further comprising the rectifier, the rectifier being coupled to the network of passive components.

3. The wireless power receiver of claim 2, wherein the network of passive components further comprises a second capacitor in parallel with an input of the rectifier.

4. The wireless power receiver of claim 3, further comprising a third capacitor coupled between the first capacitor and the second capacitor.

5. The wireless power receiver of claim 1, wherein the plurality of inductive elements is arranged to perform low-Q inductive charging in a low frequency range including the first resonant frequency.

6. The wireless power receiver of claim 1, wherein the plurality of inductive elements is arranged to perform high-Q resonant charging in a high frequency range including the second resonant frequency.

7. The wireless power receiver of claim 1, further comprising the rectifier, wherein the rectifier comprises a synchronous rectifier or a bridge rectifier.

8. The wireless power receiver of claim 1, wherein an effective inductance of the electromagnetic resonator is lower at the second resonant frequency than at the first resonant frequency.

9. The wireless power receiver of claim 1, wherein the plurality of inductive elements is fabricated in the same plane of a printed circuit board.

10. The wireless power receiver of claim 1, wherein the plurality of inductive elements comprises first and second inductive elements, wherein the first inductive element surrounds the second inductive element.

11. The wireless power receiver of claim 1, wherein the first resonant frequency is lower than the second resonant frequency by a factor of at least five.

12. The wireless power receiver of claim 1, wherein the second resonant frequency is within the ISM band.

13. The wireless power receiver of claim 1, wherein the first resonant frequency is between 100 kHz and 200 kHz and the second resonant frequency is 6.78 MHz.

14. The wireless power receiver of claim 1, wherein the plurality of inductive elements further comprises a second inductive element, and the first capacitor has a terminal coupled between the first inductive element and the second inductive element.

15. The wireless power receiver of claim 1, wherein the plurality of inductive elements further comprises a second inductive element concentric with the first inductive element.

16. The wireless power receiver of claim 1, further comprising:
a plurality of switching elements coupled to the network of passive components to convert from AC to DC.

17. The wireless power receiver of claim 1, wherein the wireless power receiver is a multi-mode wireless power receiver configured to receive power wirelessly at the first resonant frequency or the second resonant frequency.

18. The wireless power receiver of claim 1, wherein the wireless power receiver is configured to provide in-band communications based on load modulation.

* * * * *

UNITED STATES PATENT AND TRADEMARK OFFICE
CERTIFICATE OF CORRECTION

PATENT NO. : 9,912,197 B2
APPLICATION NO. : 13/956374
DATED : March 6, 2018
INVENTOR(S) : Patrick Stanley Riehl Page 1 of 1

It is certified that error appears in the above-identified patent and that said Letters Patent is hereby corrected as shown below:

In the Claims

In Claim 1, at Column 6, Line 34, add "a" between the words "forming" and "receiver"

Signed and Sealed this
Twenty-sixth Day of March, 2019

Andrei Iancu
*Director of the United States Patent and Trademark Office*